United States Patent [19]

Müller et al.

[11] Patent Number: 4,493,630

[45] Date of Patent: Jan. 15, 1985

[54] APPARATUS FOR DEWATERING AND PLASTIFYING MIXTURES FOR THE MANUFACTURE OF EXPLOSIVES

[75] Inventors: Dietmar Müller, Karlsruhe; Hiltmar Schubert, Walzbachtal; Rudolf Kröhnert, Ettlingen, all of Fed. Rep. of Germany

[73] Assignee: Fraunhofer-Gesellschaft Zur Forderung der angewandten Forschung e.V., Munich, Fed. Rep. of Germany

[21] Appl. No.: 496,868

[22] Filed: May 23, 1983

[30] Foreign Application Priority Data

Jul. 5, 1982 [DE] Fed. Rep. of Germany ....... 3225065

[51] Int. Cl.[3] ............................................ B29F 3/03

[52] U.S. Cl. .................................. 425/203; 100/117; 264/101; 366/83; 425/204

[58] Field of Search ................. 425/203, 204; 366/83, 366/100, 156; 100/111, 112, 117, 118; 264/101, 102

[56] References Cited

U.S. PATENT DOCUMENTS

| | | | |
|---|---|---|---|
| 2,615,199 | 10/1952 | Fuller | 425/203 |
| 2,961,701 | 11/1960 | Hannold | 366/84 |
| 3,035,306 | 5/1962 | Rossiter | 425/208 |
| 3,222,797 | 12/1965 | Zies | 264/102 |
| 3,371,379 | 3/1968 | Reifenhauser | 425/203 |
| 3,375,549 | 4/1968 | Geyer | 366/83 |
| 3,535,737 | 10/1970 | Hendry | 425/203 |

FOREIGN PATENT DOCUMENTS

| | | | |
|---|---|---|---|
| 2645312 | 4/1978 | Fed. Rep. of Germany | 425/203 |
| 2825567 | 11/1979 | Fed. Rep. of Germany . | |
| 3013091 | 10/1981 | Fed. Rep. of Germany | 100/117 |
| 3044577 | 7/1982 | Fed. Rep. of Germany . | |

*Primary Examiner*—Jeffery Thurlow

*Attorney, Agent, or Firm*—McCormick, Paulding & Huber

[57] ABSTRACT

In the case of an apparatus for dewatering and plastifying water-wet mixtures of materials for manufacturing explosives, as for example mixtures for producing propellent charges, using a screw extruder with one or more screws having kneading and conveying elements and a housing, possibly made up of axial sections, with a filling port for the said mixture as wetted with water, certain steps are taken for stopping the formation of slurries at the back end or part of the screw extruder, that is to say at the filling port there is an outwardly widening drain port with a drain duct joined thereto in which there is a conveyor for clearing the expressed water and the solids therein and moving them to the back end of the screw extruder.

6 Claims, 2 Drawing Figures

APPARATUS FOR DEWATERING AND PLASTIFYING MIXTURES FOR THE MANUFACTURE OF EXPLOSIVES

BACKGROUND OF THE INVENTION

The present invention is with respect to an apparatus for dewatering and plastifying mixtures, that have been wetted with water, for the manufacture of explosives, as for example ballistic charges or propellents, using a screw extruder having one or more screws with kneading and conveying elements and a housing, that may be made up of axial sections, and with a filling port for the water containing, that is to say wet, mixture to be used for the manufacture of explosives.

DISCUSSION OF THE PRIOR ART

Mixtures of explosives, made up for example of nitrocellulose and nitroglycerin or furthermore peroxide containing substances, are mixed with water for safety reasons before being processed, as for example plastified. The dewatering and plastifying operation is normally presently undertaken in screw extruders (see German Auslegeschrift specification No. 2,825,567 and German Offenlegungsschrift specification No. 3,044,577) which may not only be run continuously but furthermore, because the process engineer is quite free to make a selection of the geometry of the extruder and of the temperature changes as a function of the position along the screw extruder, may be run to get all desired effects. Extruders with one or more screws have been used in this connection. The screw shaft is mostly designed with alternating conveying and kneading parts, the water being expressed from the material and the solids thereof being plastified at the same time. The largest amount of water is expressed from the material in the first sections coming right after the filling port of the screw extruder, the rate of water expression then being less in the back part of the extruder.

In known screw extruders the water is collected in the intake part, where the so-far unprocessed material is metered into the extruder. This is responsible for an undesired effect inasfar as slurry is produced, in which certain components of such explosive mixtures, as for example nitrogycerin or even nitroguarnidine go into solution so that the plastified material does not keep to the desired formulation. In bad cases there is even a danger of the slurry running out at the intake part of the extruder which will then be technically less safe.

SHORT OUTLINE OF THE INVENTION

One purpose of the present invention is that of so designing a screw extruder of the sort noted that no slurry is produced in the intake part of the extruder.

A further purpose of the invention is producing an extruder which may so be run that it keeps to the desired formulation of the product.

For effecting these and further purposes there is a water drain duct at the filling port, the duct running from the inner space of the screw extruder, and a conveyor in the duct for clearing the solids in the expressed water.

For stopping the accumulation of water to any great degree at the intake part of the extruder, it would as such be obvious to have draining ports at this point. However this would not be enough for producing the effect desired in the invention, inasfar as such draining ports are likely to become stopped up and water will then be quickly accumulated. In the design of the present invention the solid particles, even although present in only small amounts in the drained water, are transported away with the expressed water by the conveyor so that, as has been seen from tests made under working conditions, there are no longer any signs of slurry forming at the intake. The solid particles in the drained material may naturally enough be used for further processing.

In keeping with a preferred form of the invention, the draining or run-off duct is joined up with the space inside the extruder by way of a draining port, that becomes wider in a direction from the said space into the drain duct. Because of this, the danger of the port becoming stopped up becomes less. The amount of solids let off through the drain port may be kept down to a very low level by the right selection of the geometry of the parts in the extruder, as for example by having a concave form of the shell with a sealing strip or crest. Under working conditions the amount of solids in the drained water was less than 1%.

In a specially simple form of the extruder the conveyor may be in the form of a helix, as for example one made of thick steel wire so as to make certain that a certain pressure takes effect on the solid particles within the drain duct, even after a large amount thereof has accumulated. A further point is that the because of the large free cross section of the helix it would hardly be possible for the drain duct to become stopped up.

For more readily effecting the purposes of the invention the drain duct may be put under vacuum, this at the same time making certain that the drained off material will not be let off through any leak that may be present.

In keeping with a specially useful further development of the invention the drain duct is placed so as to be generally parallel to the axis of the screw extruder and has its outlet port at the back end of the housing. The useful effect of this design is that any heating ducts present, and which are in general parallel to the axis as well, do not have to be placed any differently because of there being the drain duct.

As part of a further useful example of the invention the drain duct is formed by a tube that is peripherally open towards the drain port, the said tube being taken up in a hole made in the housing parallel to the axis thereof, the conveyor being placed inside the tube.

This makes it possible on the one hand for the apparatus in keeping with the invention to be fitted at any time to a pre-existing screw extruder simply by producing the hole and the drain port therein, while on the other have the apparatus may readily be taken off again if it has undesired effects on function at any time. At last point, it furthermore makes sealing simple, more specially on operation under atmospheric pressure inasfar as the system may be completely enclosed and put into position at some later time.

It is best for the tube to joined up outside the housing with a vessel to take up the water-solids mixture. The vessel may at the same time be used for separating off the solid particles.

In keeping with a specially useful further development of the invention the driving power for the conveyor is taken from the drive for the screw of the extruder. If this conveyor is a helix for example, there will be a gear or other driving member between the driving shaft of the helix and the extruder screws for reversing the direction of turning. While the screws of the extruder are in fact turned in the one direction, the drained off material is to be moved by the helical shaft in the opposite direction back to the back end of the housing. Taking the drive power from the drive of the screw extruder gives the useful effect that no special explosion proofing measures have to be taken for the drive of the said helices and in fact the same are guarded by the explosion proofing system, present in any case, of the drive of the screw extruder.

Further useful effects and details of the invention will be seen from the account there now to be given.

LIST OF DIFFERENT VIEWS OF THE FIGURES

DETAILED ACCOUNT OF TWO WORKING EXAMPLES OF THE INVENTION

Figure 1:
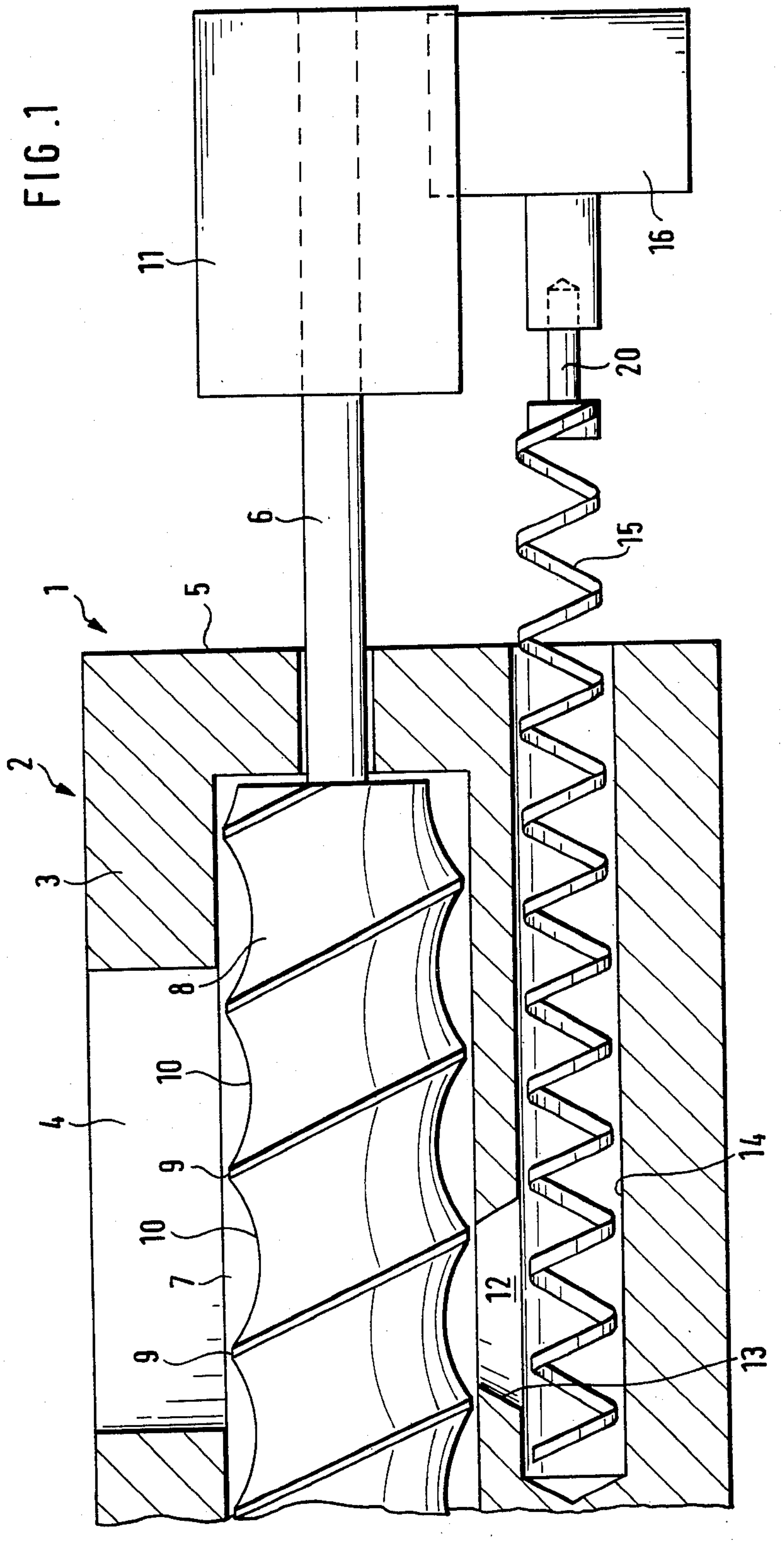
FIG. 1 is a side view and part section of a first working example of the present invention.

In the figures the reader will see only the intake part or end of a screw extruder, that may have one or more screws. The screw extruder 1 has a housing 2, that may be made up of a number of axial sections, of which the first section 3 (first in the direction of conveying, that is) is to be seen at the intake end or part of the screw extruder.

At this intake end there is a filling port 4 opening in a radial direction. The drive shaft 6 will be seen to be stretching through the back end wall 5 of the housing into the space 7 in the extruder. At this point the drive shaft has a conveying section in the form of a screw 8, such section only having a low pressing effect on the material that is metered into the extruder. The outer crest 9 of the thread of the screw is has such a profile that it gives a sealing function, whereas the base 10 of the thread has a concave dished form. The screw shaft 6 is turned by an explosion proofed drive 11, of which no details are given. The extruder is more specially a two-screw extruder, the second screw thereof being to the back or the front of the screw shaft 6 and it may be turned in the same or the opposite direction.

In its back part 3 or section the housing 2 has a drain or run-off port 12, that is generally opposite to the front part of the filling port 4. The draining port 12 has an inner face 13 that becomes wider conically in an outward direction, the port then opening into a cylindrical drain duct 14 running parallel to the axis of the screw shaft 6 from the back end 5 of the housing part 3. Within the drain duct 14 there is a conveyor 15 in the form of a helix, whose outer end is turned by way of a driving member 16 from the drive 11 of the screw shafts in a direction opposite to the direction of turning of the screw, that is to say the helix 15 is turned so that the water, coming by way of the drain port 12 into the drain duct with the solid particles, is moved out of the apparatus at the back end.

Figure 2:
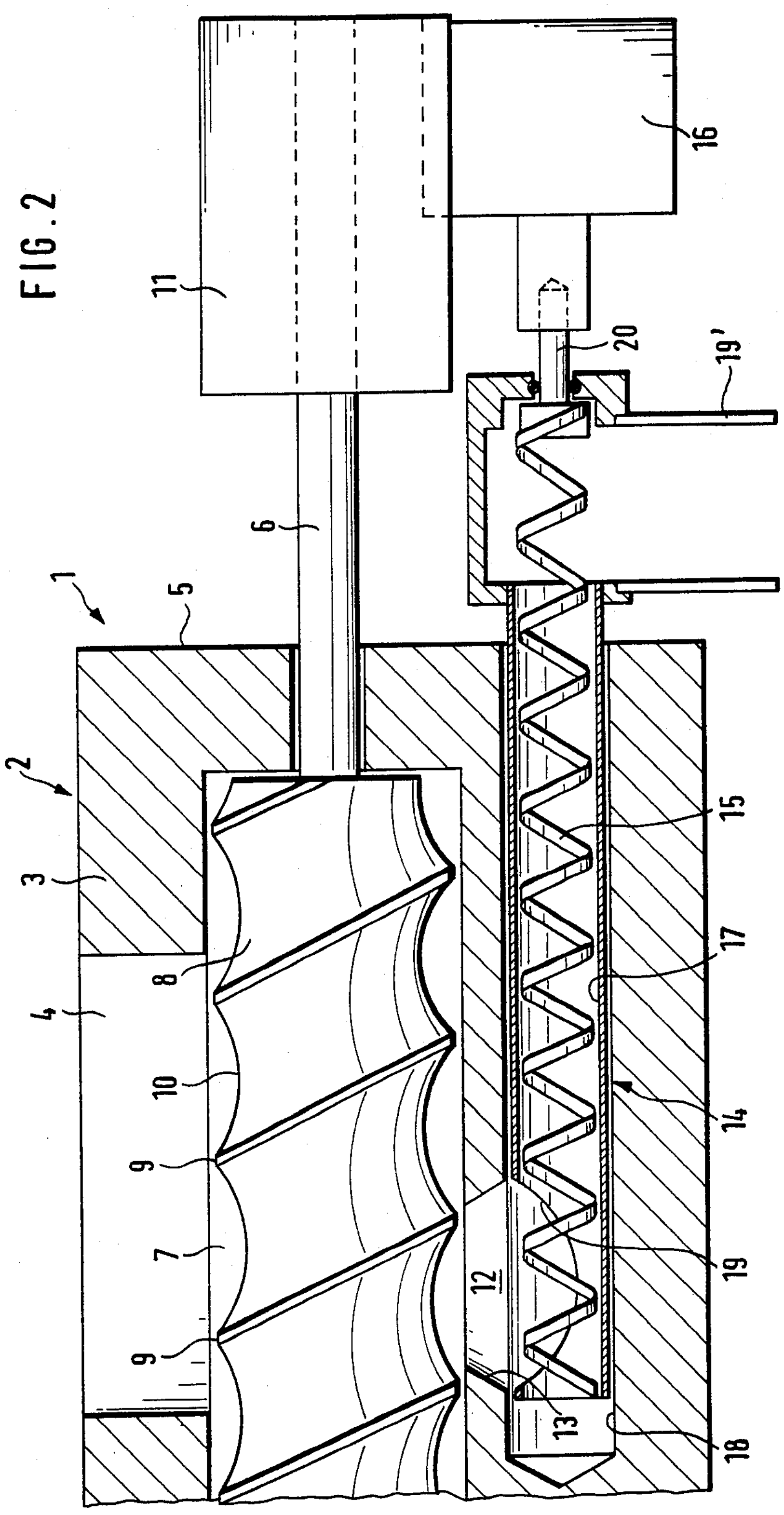
FIG. 2 is a view, on the same general lines as FIG. 1, of a second working example of the invention.

In the working example of FIG. 2 the drain duct 14 is formed by a tube 17 that is pushed into a hole 18 made in the housing section or part 3 so as to be parallel to the axis. In the present case as well the conveyor 15, in the form of a helix, is placed in the tube 17. At its end within the housing the tube 17 has a peripheral opening 19, that, once the tube has been slipped into position, is somewhat lower down than the drain port 12. At a point outside the housing 2 of the screw extruder 1 the tube is joined up with a collecting vessel 19 with a sealed joint, the drive shaft 20 of the helix running through the vessel 19. The said vessel 19 may if desired be put under vacuum using, for example, an oil or water jet pump.

Given a great enough length and the right design in other respects of the separate sections of the screws, the apparatus in keeping with the invention may be run as an extruder, that is to say for directly producing one or more extrusions of the material that has been wetted with water, whereas if the processing length is short, the apparatus may be used as a screw press for dewatering, the dewatered and plastified product then being further processed in other process stages.

We claim:

1. Apparatus for dewatering and plastifying a mixture of at least one explosive substance together with a quantity of water and extraneous solids, and comprising a housing having an axially extending extrusion opening and an inlet port in communication therewith for admitting the mixture in its wet condition, a screw extruder provided in said axially extending opening for kneading and conveying the mixture from said inlet port forwardly in a generally axial direction, said housing further including means defining an elongated duct terminating in a drain exterior to the housing, said housing including a drain port passageway connecting said axially extending opening with said elongated duct, said drain passageway diverging in a direction away from the axially extending extruder opening toward said elongated duct, and a helically shaped conveyor coil within said elongated duct, said coil having an interior forward end extending forwardly beyond said drain opening and having an exterior back end extending rearwardly beyond said drain opening and outside the housing, said exterior end adapted to be rotated externally of the housing so that water and solids contained in the water can be carried out of said elongated duct.

2. The apparatus as defined in claim 1 further comprising means for placing said elongated drain duct under vacuum.

3. The apparatus as defined in claim 1 wherein said elongated drain duct is oriented generally parallel to the axis of said extruder opening, and wherein said elongated duct has its outlet located at the upstream or backend of said housing opposite the downstream end of said axially extending extruder opening.

4. The apparatus as defined in claim 1 further comprising a vessel outside said housing, said vessel having openings through which said conveyor coil extends so that the water and solids carried away by said conveyor coil move through said duct outlet into said vessel.

5. The apparatus as defined in claim 1 further comprising drive means for said extruder, and means for extracting driving power from said extruder drive means to drive said conveyor coil.

6. The apparatus according to claim 5 wherein said conveyor coil is driven in the opposite direction from that of said extruder.

* * * * *